US012531202B2

(12) United States Patent
Suzuki et al.

(10) Patent No.: US 12,531,202 B2
(45) Date of Patent: Jan. 20, 2026

(54) X-RAY TUBE, X-RAY GENERATOR, AND METHOD FOR PRODUCING WINDOW MEMBER

(71) Applicant: HAMAMATSU PHOTONICS K.K., Hamamatsu (JP)

(72) Inventors: Naonobu Suzuki, Hamamatsu (JP); Atsushi Ishii, Hamamatsu (JP); Ryosuke Yabushita, Hamamatsu (JP); Akimichi Shimizu, Hamamatsu (JP); Naofumi Kosugi, Hamamatsu (JP); Ginji Sugiura, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 162 days.

(21) Appl. No.: 18/571,441

(22) PCT Filed: Mar. 9, 2022

(86) PCT No.: PCT/JP2022/010372
§ 371 (c)(1),
(2) Date: Dec. 18, 2023

(87) PCT Pub. No.: WO2022/270033
PCT Pub. Date: Dec. 29, 2022

(65) Prior Publication Data
US 2024/0290568 A1 Aug. 29, 2024

(30) Foreign Application Priority Data
Jun. 24, 2021 (JP) ................................ 2021-104652

(51) Int. Cl.
*H01J 35/18* (2006.01)
*H01J 9/24* (2006.01)

(52) U.S. Cl.
CPC ................ *H01J 35/18* (2013.01); *H01J 9/24* (2013.01); *H01J 2209/264* (2013.01)

(58) Field of Classification Search
None
See application file for complete search history.

(56) References Cited

U.S. PATENT DOCUMENTS

2008/0075229 A1* 3/2008 Ryan ..................... H01J 35/112 378/70
2014/0205071 A1 7/2014 Ikarashi et al.
(Continued)

FOREIGN PATENT DOCUMENTS

JP 2013-160637 A 8/2013
JP 2014-137966 A 7/2014
(Continued)

OTHER PUBLICATIONS

Hamaguchi, Tomohiro, "Introduction to Electronic Properties," Maruzen Co., Ltd., May 30, 1979.
(Continued)

*Primary Examiner* — Hoon K Song
(74) *Attorney, Agent, or Firm* — Faegre Drinker Biddle & Reath LLP

(57) ABSTRACT

An X-ray tube includes a housing, an electron gun that emits an electron beam inside the housing, a target that generates an X-ray upon an incidence of the electron beam inside the housing, and a window member that seals an opening of the housing and that transmits the X-ray. The window member is formed in a plate shape from a single crystal diamond. A [100] direction of the single crystal diamond is in an intersection relationship with a thickness direction of the window member at an angle of less than 45 degrees.

8 Claims, 5 Drawing Sheets

(56) References Cited

U.S. PATENT DOCUMENTS

| | | | | |
|---|---|---|---|---|
| 2015/0311026 | A1* | 10/2015 | Tsukamoto | G01N 23/04<br>427/249.17 |
| 2016/0020061 | A1* | 1/2016 | Ikarashi | H01J 35/116<br>378/111 |
| 2016/0240343 | A1* | 8/2016 | Mazellier | H01J 35/065 |
| 2017/0130362 | A1 | 5/2017 | Nishibayashi et al. | |
| 2017/0372965 | A1 | 12/2017 | Nishibayashi et al. | |
| 2018/0221830 | A1 | 8/2018 | Larson et al. | |
| 2019/0079327 | A1* | 3/2019 | Kim | G02F 1/13781 |
| 2019/0218685 | A1 | 7/2019 | Nishibayashi et al. | |
| 2023/0250553 | A1 | 8/2023 | Noguchi et al. | |

FOREIGN PATENT DOCUMENTS

| | | | |
|---|---|---|---|
| JP | 2016-020304 | A | 2/2016 |
| JP | 5911323 | B2 | 4/2016 |
| JP | 6381269 | B2 | 8/2018 |
| JP | 6452334 | B2 | 1/2019 |
| JP | 2021-006501 | A | 1/2021 |
| JP | 2021-080153 | A | 5/2021 |
| TW | 200421497 | A | 10/2004 |
| WO | WO-2016/010028 | A1 | 1/2016 |
| WO | WO-2017/014311 | A1 | 1/2017 |
| WO | WO-2018/092361 | A1 | 5/2018 |

OTHER PUBLICATIONS

International Preliminary Report on Patentability mailed Jan. 4, 2024 for PCT/JP2022/010372.

* cited by examiner

X-RAY TUBE, X-RAY GENERATOR, AND METHOD FOR PRODUCING WINDOW MEMBER

TECHNICAL FIELD

The present disclosure relates to an X-ray tube, an X-ray generation device, and a method for manufacturing a window member.

BACKGROUND ART

An X-ray tube including a housing; an electron gun that emits an electron beam inside the housing; a target that generates an X-ray upon the incidence of the electron beam inside the housing; and a window member that seals an opening of the housing and that transmits the X-ray is known. In such an X-ray tube, the window member may be formed in a plate shape from a single crystal diamond, and the target may be formed on an inner surface of the window member (for example, refer to Patent Literature 1).

CITATION LIST

Patent Literature

Patent Literature 1: Japanese Patent No. 5911323

SUMMARY OF INVENTION

Technical Problem

The window member formed in a plate shape from the single crystal diamond is excellent in X-ray transmission properties, heat resistance, heat dissipation, and the like, but has the problem of being likely to crack along a crystal plane. Particularly, in an X-ray inspection device using a small-focus X-ray tube, in order to increase the magnification, an inspection object is brought closer to a window member, which results in the possibility of the inspection object coming into contact with the window member. Therefore, it is extremely important to solve the foregoing problem and improve the crack resistance of the window member.

An object of the present disclosure is to provide an X-ray tube, an X-ray generation device, and a method for manufacturing a window member capable of improving the crack resistance of a window member formed in a plate shape from a single crystal diamond.

Solution to Problem

According to one aspect of the present disclosure, an X-ray tube includes a housing, an electron gun that emits an electron beam inside the housing, a target that generates an X-ray upon an incidence of the electron beam inside the housing, and a window member that seals an opening of the housing and that transmits the X-ray. The window member is formed in a plate shape from a single crystal diamond. A [100] direction of the single crystal diamond is in an intersection relationship with a thickness direction of the window member at an angle of less than 45 degrees.

In the X-ray tube, in the window member formed in a plate shape from the single crystal diamond, the [100] direction of the single crystal diamond is in an intersection relationship with the thickness direction of the window member at an angle of less than 45 degrees. Accordingly, compared to when the [100] direction of the single crystal diamond is parallel to the thickness direction of the window member (namely, when a (100) plane of the single crystal diamond is perpendicular to the thickness direction of the window member), among a plurality of types of crystal planes of the single crystal diamond, the number of the crystal planes parallel to the thickness direction of the window member is reduced, and as a result, the window member is less likely to crack along the crystal planes. Therefore, according to the X-ray tube, the crack resistance of the window member formed in a plate shape from the single crystal diamond can be improved.

In the X-ray tube according to one aspect of the present disclosure, a [010] direction and a [001] direction of the single crystal diamond may be in an intersection relationship with a plane perpendicular to the thickness direction of the window member at an angle of less than 45 degrees. Accordingly, among the plurality of types of crystal planes of the single crystal diamond, the number of the crystal planes parallel to the thickness direction of the window member is further reduced, and as a result, the window member is much less likely to crack along the crystal planes. Therefore, the crack resistance of the window member formed in a plate shape from the single crystal diamond can be more reliably improved.

In the X-ray tube according to one aspect of the present disclosure, the window member may have a first surface opposite to an interior of the housing, and the [100] direction of the single crystal diamond may be in an intersection relationship with a direction perpendicular to the first surface at an angle of less than 45 degrees. Accordingly, the occurrence of cracks in the window member due to an external force acting on the first surface of the window member can be suppressed.

In the X-ray tube according to one aspect of the present disclosure, the window member may be attached to an attachment surface of the housing around the opening, and the [100] direction of the single crystal diamond may be in an intersection relationship with a direction perpendicular to the attachment surface at an angle of less than 45 degrees. In this case as well, the crack resistance of the window member formed in a plate shape from the single crystal diamond can be improved.

In the X-ray tube according to one aspect of the present disclosure, the window member may have a second surface on an interior side of the housing, and the target may be formed on the second surface. Accordingly, in the transmission type X-ray tube, the crack resistance of the window member formed in a plate shape from the single crystal diamond can be improved.

In the X-ray tube according to one aspect of the present disclosure, the [100] direction of the single crystal diamond may be in an intersection relationship with a direction of the incidence of the electron beam on the target at an angle of less than 45 degrees. In this case as well, the crack resistance of the window member formed in a plate shape from the single crystal diamond can be improved.

In the X-ray tube according to one aspect of the present disclosure, the [100] direction of the single crystal diamond may be in an intersection relationship with the thickness direction of the window member at an angle of 0.1 degrees to 7 degrees. Accordingly, for example, when the window member is extracted from a single crystal diamond substrate having the (100) plane as a major surface while improving the crack resistance of the window member formed in a plate shape from the single crystal diamond, the window member in which the [100] direction of the single crystal diamond is in an intersection relationship with the thickness direction of the window member at an angle of less than 45 degrees can be easily and efficiently extracted.

According to one aspect of the present disclosure, there is provided an X-ray generation device including: the X-ray tube; and a power supply part that applies a voltage to the electron gun.

According to the X-ray generation device, for the foregoing reasons, the crack resistance of the window member formed in a plate shape from the single crystal diamond can be improved.

According to one aspect of the present disclosure, there is provided a method for manufacturing a window member, the method including: a first forming step of forming a single crystal diamond substrate having a (100) plane as a major surface through an epitaxial growth; and an extraction step of extracting a window member having a plate shape from the single crystal diamond substrate. In the extraction step, the window member is extracted from the single crystal diamond substrate such that a [100] direction of a single crystal diamond intersects a thickness direction of the window member at an angle of less than 45 degrees.

According to one aspect of the present disclosure, there is provided a method for manufacturing a window member, the method including: a preparation step of preparing a seed substrate having a major surface that is in an intersection relationship with a (100) plane at an angle of less than 45 degrees; a first forming step of forming a single crystal diamond substrate on the major surface of the seed substrate through an epitaxial growth; and an extraction step of extracting a window member having a plate shape from the single crystal diamond substrate by performing cutting along a direction perpendicular to a thickness direction of the single crystal diamond substrate.

In the method for manufacturing a window member, in the obtained window member, the [100] direction of the single crystal diamond is in an intersection relationship with the thickness direction of the window member at an angle of less than 45 degrees. Therefore, according to the method for manufacturing a window member, the crack resistance of the window member formed in a plate shape from the single crystal diamond can be improved.

The method for manufacturing a window member according to one aspect of the present disclosure may further include a second forming step of forming a target on one surface of the window member in the thickness direction, the target configured to generate an X-ray upon an incidence of an electron beam. Accordingly, the window member for a transmission type X-ray tube can be obtained.

In the method for manufacturing a window member according to one aspect of the present disclosure, the [100] direction of the single crystal diamond may be in an intersection relationship with the thickness direction of the window member at an angle of 0.1 degrees to 7 degrees. Accordingly, for example, when the window member is extracted from a single crystal diamond substrate having the (100) plane as a major surface while improving the crack resistance of the window member formed in a plate shape from the single crystal diamond, the window member in which the [100] direction of the single crystal diamond is in an intersection relationship with the thickness direction of the window member at an angle of less than 45 degrees can be easily and efficiently extracted.

Advantageous Effects of Invention

According to the present disclosure, it is possible to provide the X-ray tube, the X-ray generation device, and the method for manufacturing a window member capable of improving the crack resistance of the window member formed in a plate shape from the single crystal diamond.

DESCRIPTION OF EMBODIMENTS

Figure 1:
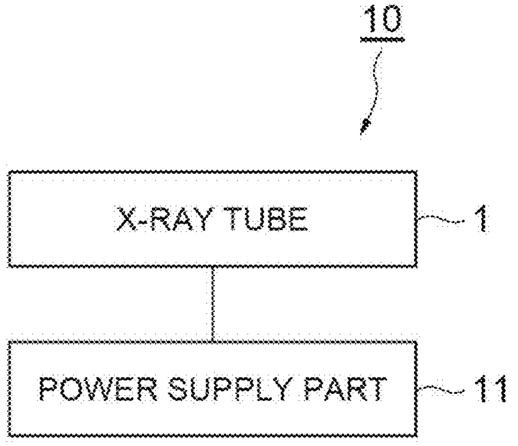
FIG. 1 is a block diagram of an X-ray generation device of one embodiment.

Hereinafter, embodiments of the present disclosure will be described in detail with reference to the drawings. Incidentally, in the drawings, the same or corresponding portions are denoted by the same reference signs, and duplicate descriptions will be omitted.

[Configuration of X-Ray Generation Device]

As shown in FIG. 1, an X-ray generation device 10 includes an X-ray tube 1 and a power supply part 11. The X-ray tube 1 and the power supply part 11 are supported inside a casing (not shown) made of metal. As one example, the X-ray tube 1 is a small-focus X-ray source, and the X-ray generation device 10 is a device used for X-ray non-destructive inspection for magnifying and observing an internal structure of an inspection object.

Figure 2:
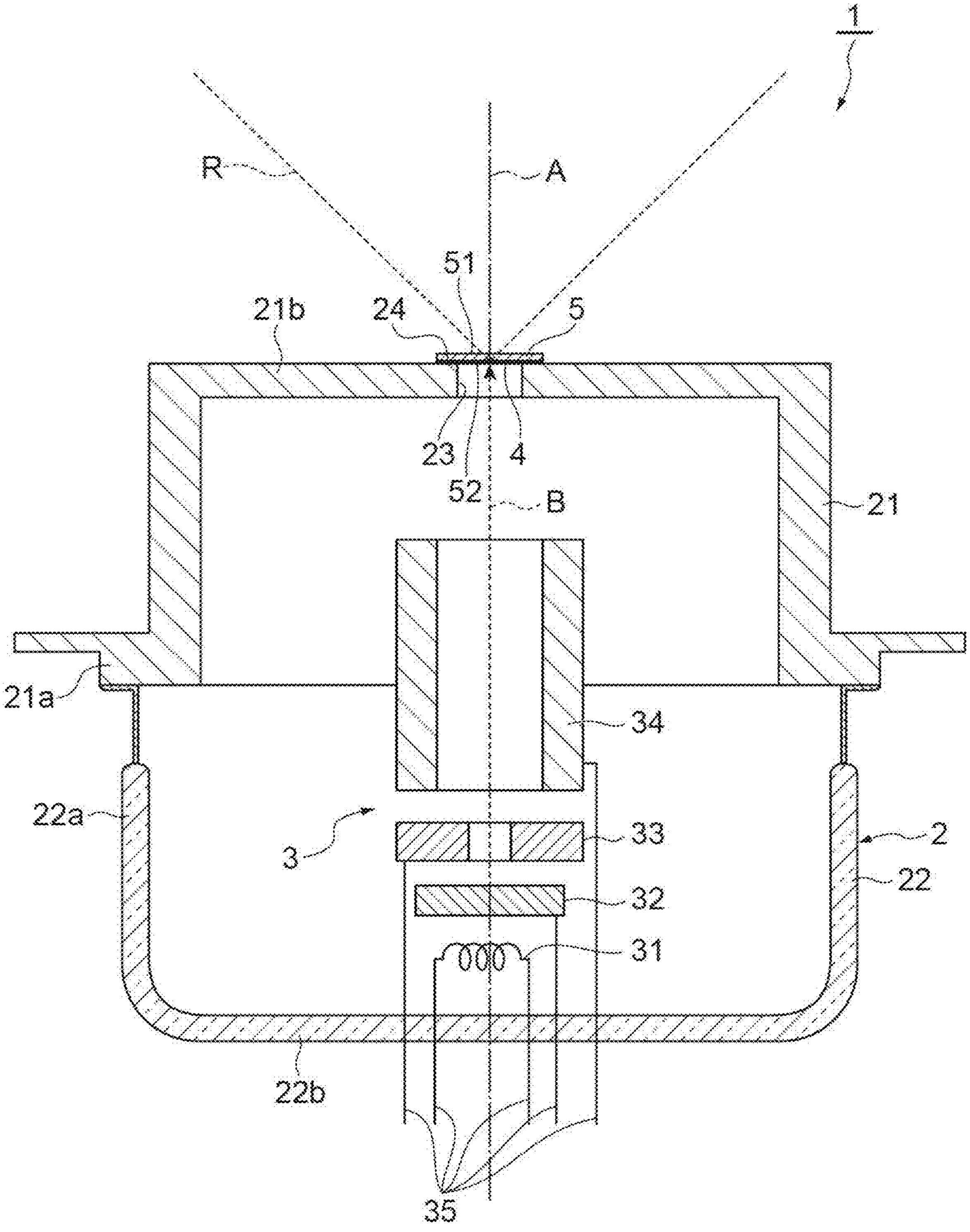
FIG. 2 is a cross-sectional view of an X-ray tube shown in FIG. 1.

As shown in FIG. 2, the X-ray tube 1 includes a housing 2, an electron gun 3, a target 4, and a window member 5. As described below, the X-ray tube 1 is configured as a sealed transmission type X-ray tube that does not require replacement of components and the like.

The housing 2 includes a head 21 and a valve 22. The head 21 is formed in a bottomed tubular shape from metal. The valve 22 is formed in a bottomed tubular shape from an insulating material such as glass. An opening portion 22*a* of the valve 22 is airtightly joined to an opening portion 21*a* of the head 21. In the X-ray tube 1, a center line of the housing 2 is a tube axis A. An opening 23 is formed in a bottom wall portion 21*b* of the head 21. The opening 23 is located on the tube axis A. The opening 23 has, for example, a circular shape with the tube axis A as the center line when viewed in a direction parallel to the tube axis A.

The electron gun 3 emits an electron beam B inside the housing 2. The electron gun 3 includes a heater 31, a cathode 32, a first grid electrode 33, and a second grid electrode 34. The heater 31, the cathode 32, the first grid electrode 33, and the second grid electrode 34 are disposed on the tube axis A in this order from a bottom wall portion 22*b* side of the valve 22. The heater 31 is composed of a filament, and generates heat when energized. The cathode 32 is heated by the heater 31 to release electrons. The first grid electrode 33 is formed in a tubular shape, and adjusts the amount of the electrons released from the cathode 32. The second grid electrode 34 is formed in a tubular shape, and focuses the electrons, which have passed through the first grid electrode 33, onto the target 4. The heater 31, the cathode 32, the first grid electrode 33, and the second grid electrode 34 are electrically and physically connected to a plurality of respective lead pins 35 penetrating through a bottom wall portion 22*b* of the valve 22.

The window member 5 seals the opening 23 of the housing 2. The window member 5 is formed in a plate shape from a single crystal diamond. The window member 5 has, for example, a disk shape with the tube axis A as the center line. The window member 5 has a first surface 51 and a second surface 52. The first surface 51 is a surface opposite to the interior of the housing 2, and the second surface 52 is a surface on an interior side of the housing 2. Each of the first surface 51 and the second surface 52 is, for example, a flat surface perpendicular to the tube axis A. The target 4 is formed on the second surface 52 of the window member 5. The target 4 is, for example, formed in a film shape from tungsten. The target 4 generates an X-ray R upon the incidence of the electron beam B inside the housing 2. In the present embodiment, the X-ray R generated in the target 4 transmits through the target 4 and the window member 5, and is emitted to the outside.

The window member 5 is attached to an attachment surface 24 around the opening 23 of the housing 2. The attachment surface 24 is, for example, a flat surface perpendicular to the tube axis A, and is formed on the head 21. The window member 5 is airtightly joined to the attachment surface 24 via a joining member (not shown) such as a brazing material. In the X-ray tube 1, the target 4 is electrically connected to the head 21, and the target 4 and the window member 5 are thermally connected to the head 21. As one example, the target 4 is set to the ground potential via the head 21. As one example, heat generated in the target 4 upon the incidence of the electron beam B is transferred to the head 21 directly and/or via the window member 5, and is released from the head 21 to a heat dissipation part (not shown). In the present embodiment, an inner space of the housing 2 is maintained at a high degree of vacuum by the housing 2, the target 4, and the window member 5.

In the X-ray generation device 10 configured as described above, a negative voltage is applied to the electron gun 3 by the power supply part 11 with the potential of the target 4 as a reference. As one example, the power supply part 11 applies a negative high voltage (for example, −10 kV to −500 kV) to each part of the electron gun 3 via each of the lead pins 35 in a state where the target 4 is set to the ground potential. The electron beam B emitted from the electron gun 3 is focused onto the target 4 along the tube axis A. The X-ray R generated in an irradiation region of the electron beam B on the target 4 transmits through the target 4 and the window member 5 and is emitted to the outside with the irradiation region as the focal point.

[Configuration of Window Member]

Figure 3:
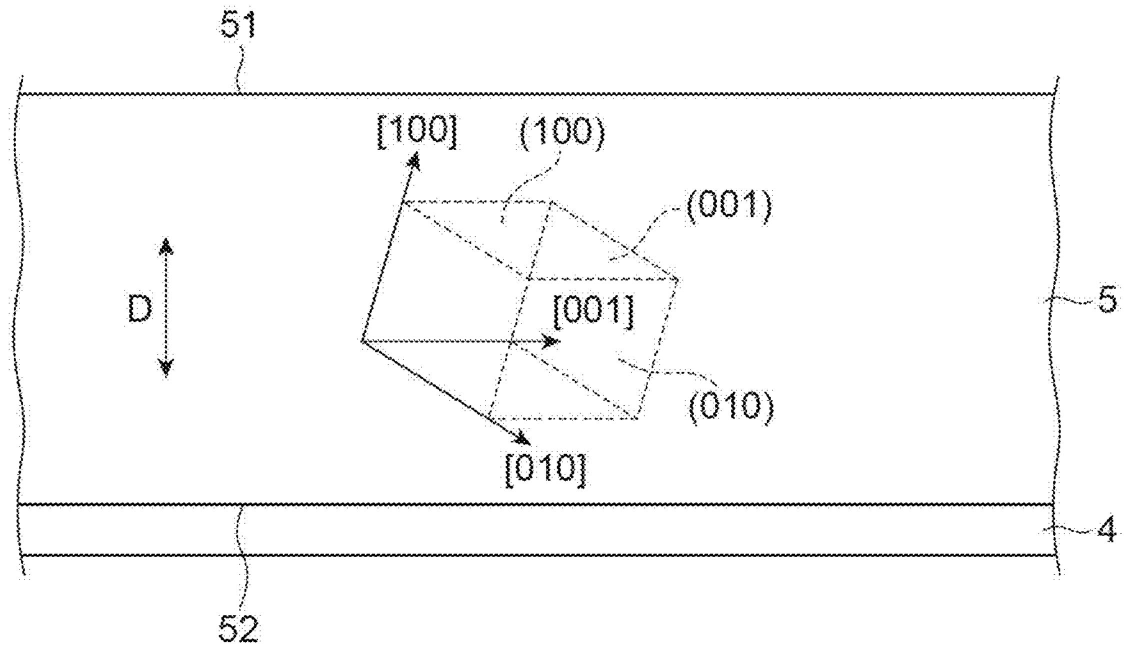
FIG. 3 is a side view of a portion of a window member shown in FIG. 2.

As shown in FIG. 3, in the window member 5, a [100] direction of the single crystal diamond is in an intersection relationship with a thickness direction D of the window member 5 at an angle of less than 45 degrees (more preferably, an angle of 0.1 degrees to 7 degrees). In other words, in the window member 5, a (100) plane of the single crystal diamond is in an intersection relationship with a plane perpendicular to the thickness direction D of the window member 5 (for example, a plane parallel to the first surface 51) at an angle of less than 45 degrees. The thickness direction D is, for example, a direction in which the first surface 51 faces the second surface 52. Incidentally, the "intersection relationship" means an intersection relationship at an angle larger than 0 degrees.

In the present embodiment, in the window member 5, a [010] direction and a [001] direction of the single crystal diamond are in an intersection relationship with a plane perpendicular to the thickness direction D of the window member 5 (for example, a plane parallel to the first surface 51) at an angle of less than 45 degrees. In other words, in the window member 5, a (010) plane and a (001) plane of the single crystal diamond are in an intersection relationship with the thickness direction D of the window member 5 at an angle of less than 45 degrees. As one example, in the window member 5, with the thickness direction D of the window member 5 as a reference, the [100] direction of the single crystal diamond is inclined at an angle of 0.1 degrees to 7 degrees around an axis parallel to a [011] direction, and is inclined at an angle of 0.1 degrees to 7 degrees around an axis parallel to a [0-11] direction.

Taking the first surface 51 of the window member 5 as a reference, in the window member 5, the [100] direction of the single crystal diamond is in an intersection relationship with a direction perpendicular to the first surface 51 at an angle of less than 45 degrees. Taking the attachment surface 24 around the opening 23 of the housing 2 as a reference, in the window member 5, the [100] direction of the single crystal diamond is in an intersection relationship with a direction perpendicular to the attachment surface 24 at an angle of less than 45 degrees. When the electron beam B is incident on the target 4 along the tube axis A (parallel to the tube axis A), in the window member 5, the [100] direction of the single crystal diamond is in an intersection relationship with the direction of the incidence of the electron beam B on the target 4 at an angle of less than 45 degrees. Incidentally, the window member 5 is not limited to being composed of a single crystal diamond substrate integrally formed as a single substrate, and may be composed of a mosaic single crystal diamond substrate formed as a single substrate by adjacently joining a plurality of single crystal diamond members in a lateral direction. Since the window member 5 composed of a mosaic single crystal diamond substrate is formed by adjacently joining a plurality of single crystal diamond members in a state where the foregoing conditions are satisfied, the window member 5 can also have the same characteristics as those of the window member 5 composed of a single crystal diamond substrate integrally formed as a single substrate.

[Method for Manufacturing Window Member]

Figure 4:
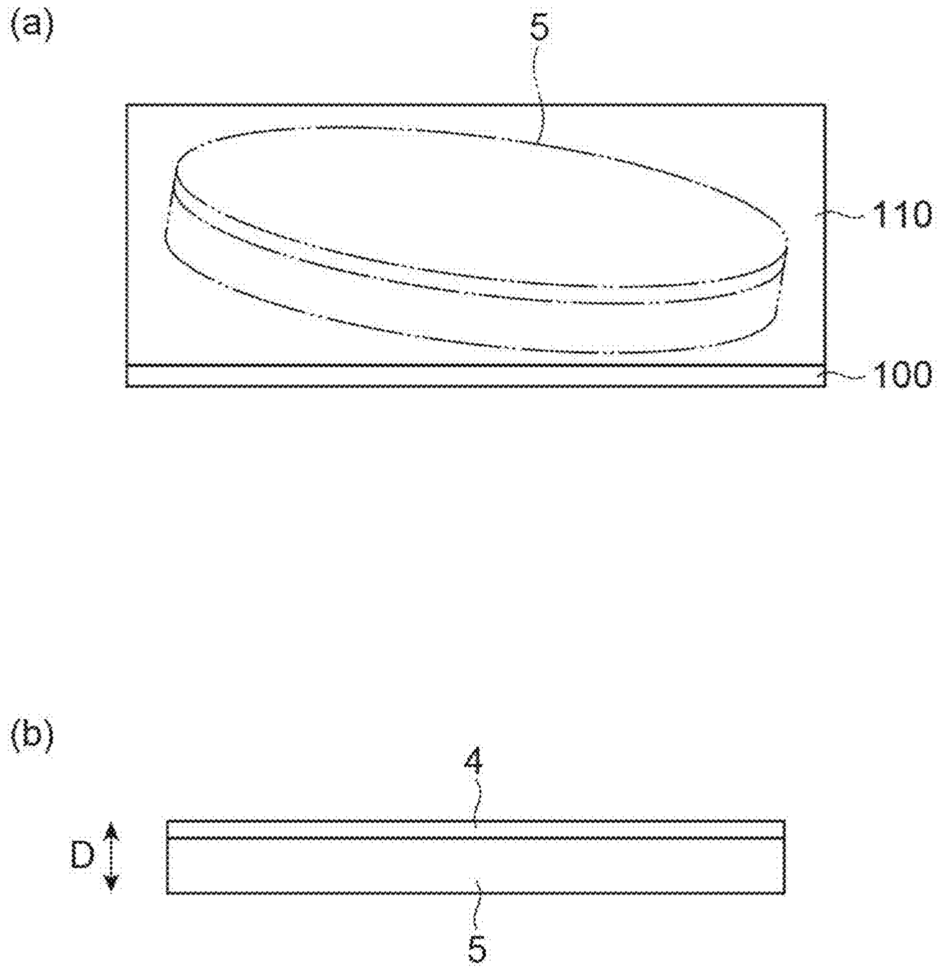
FIG. 4 is a side view showing a method for manufacturing the window member shown in FIG. 2.

As shown in (a) of FIG. 4, a seed substrate 100 having the (100) plane as a major surface is prepared, and a single crystal diamond substrate 110 having the (100) plane as a major surface is formed by epitaxial growth (for example, CVD method) on the major surface of the seed substrate 100 (first forming step). Subsequently, the window member 5 is extracted from the single crystal diamond substrate 110 such that the [100] direction of the single crystal diamond intersects the thickness direction of the window member 5 at an angle of less than 45 degrees (extraction step). As one example, the window member 5 is obtained by being cut from the single crystal diamond substrate 110 through machining or laser processing, and by polishing an outer surface. Subsequently, as shown in (b) of FIG. 4, the target 4 is formed on one surface of the window member 5 in the thickness direction D (second forming step). The formation of the target 4 is performed, for example, by sputtering.

Incidentally, the seed substrate 100 having a major surface that is in an intersection relationship with the (100) plane at an angle of less than 45 degrees is prepared (preparation step), the single crystal diamond substrate 110 is formed on the major surface of the seed substrate 100 by epitaxial growth (first forming step), and the window member 5 may be extracted from the single crystal diamond substrate 110 by performing cutting along a direction perpendicular to a thickness direction of the single crystal diamond substrate 110 (extraction step). In this case, the single crystal diamond substrate 110 in which the [100] direction of the single crystal diamond is in an intersection relationship with the thickness direction of the single crystal diamond substrate 110 at an angle of less than 45 degrees is formed by epitaxial growth. For that reason, the window member 5 in which the [100] direction of the single crystal diamond is in an intersection relationship with the thickness direction of the window member 5 at an angle of less than 45 degrees can be easily obtained by performing cutting along the direction perpendicular to the thickness direction of the single crystal diamond substrate 110.

Actions and Effects

According to the X-ray tube 1, in the window member 5 formed in a plate shape from the single crystal diamond, the [100] direction of the single crystal diamond is in an intersection relationship with the thickness direction D of the window member 5 at an angle of less than 45 degrees. Accordingly, compared to when the [100] direction of the single crystal diamond is parallel to the thickness direction D of the window member 5 (namely, when the (100) plane of the single crystal diamond is perpendicular to the thickness direction D of the window member 5), among a plurality of types of the crystal planes (for example, (0-11) plane, (011) plane, and the like) of the single crystal diamond, the number of the crystal planes parallel to the thickness direction D of the window member 5 is reduced, and as a result, the window member 5 is less likely to crack along the crystal planes. Therefore, according to the X-ray tube 1 and the X-ray generation device 10 including the X-ray tube 1, the crack resistance of the window member 5 formed in a plate shape from the single crystal diamond can be improved.

Incidentally, in a case where the [100] direction of the single crystal diamond is in an intersection relationship with the thickness direction of the window member 5 at an angle of 0.1 degrees to 7 degrees, for example, when the window member 5 is extracted from the single crystal diamond substrate 110 having the (100) plane as a major surface while improving the crack resistance of the window member 5 formed in a plate shape from the single crystal diamond, the window member in which the [100] direction of the single crystal diamond is in an intersection relationship with the thickness direction of the window member 5 at an angle of less than 45 degrees can be easily and efficiently extracted.

According to the X-ray tube 1, in the window member 5, the [010] direction and the [001] direction of the single crystal diamond are in an intersection relationship with the plane perpendicular to the thickness direction D of the window member 5 at an angle of less than 45 degrees. Accordingly, among the plurality of types of crystal planes of the single crystal diamond, the number of the crystal planes parallel to the thickness direction D of the window member 5 is further reduced (at least the (0-11) plane and the (011) plane are not parallel to the thickness direction D of the window member 5), and as a result, the window member 5 is much less likely to crack along the crystal planes. Therefore, the crack resistance of the window member 5 formed in a plate shape from the single crystal diamond can be more reliably improved.

According to the X-ray tube 1, in the window member 5, the [100] direction of the single crystal diamond is in an intersection relationship with the direction perpendicular to the first surface 51 of the window member 5 at an angle of less than 45 degrees. Accordingly, the occurrence of cracks in the window member 5 due to an external force acting on the first surface 51 of the window member 5 can be suppressed.

According to the X-ray tube 1, in the window member 5, the [100] direction of the single crystal diamond is in an intersection relationship with the direction perpendicular to the attachment surface 24 around the opening 23 of the housing 2 at an angle of less than 45 degrees. In this case as well, the crack resistance of the window member 5 formed in a plate shape from the single crystal diamond can be improved.

In the X-ray tube 1, the target 4 is formed on the second surface 52 of the window member 5. Accordingly, in the transmission type X-ray tube, the crack resistance of the window member 5 formed in a plate shape from the single crystal diamond can be improved.

According to the X-ray tube 1, in the window member 5, the [100] direction of the single crystal diamond is in an intersection relationship with the direction of the incidence of the electron beam B on the target 4 at an angle of less than 45 degrees. In this case as well, the crack resistance of the window member 5 formed in a plate shape from the single crystal diamond can be improved.

In the method for manufacturing the window member 5, in the obtained window member 5, the [100] direction of the single crystal diamond is in an intersection relationship with the thickness direction D of the window member 5 at an angle of less than 45 degrees. Therefore, according to the method for manufacturing the window member 5, the crack resistance of the window member 5 formed in a plate shape from the single crystal diamond can be improved.

In the method for manufacturing the window member 5, the target 4 is formed on the one surface of the window member 5 in the thickness direction D. Accordingly, the window member 5 for a transmission type X-ray tube can be obtained.

Modification Example

Figure 5:
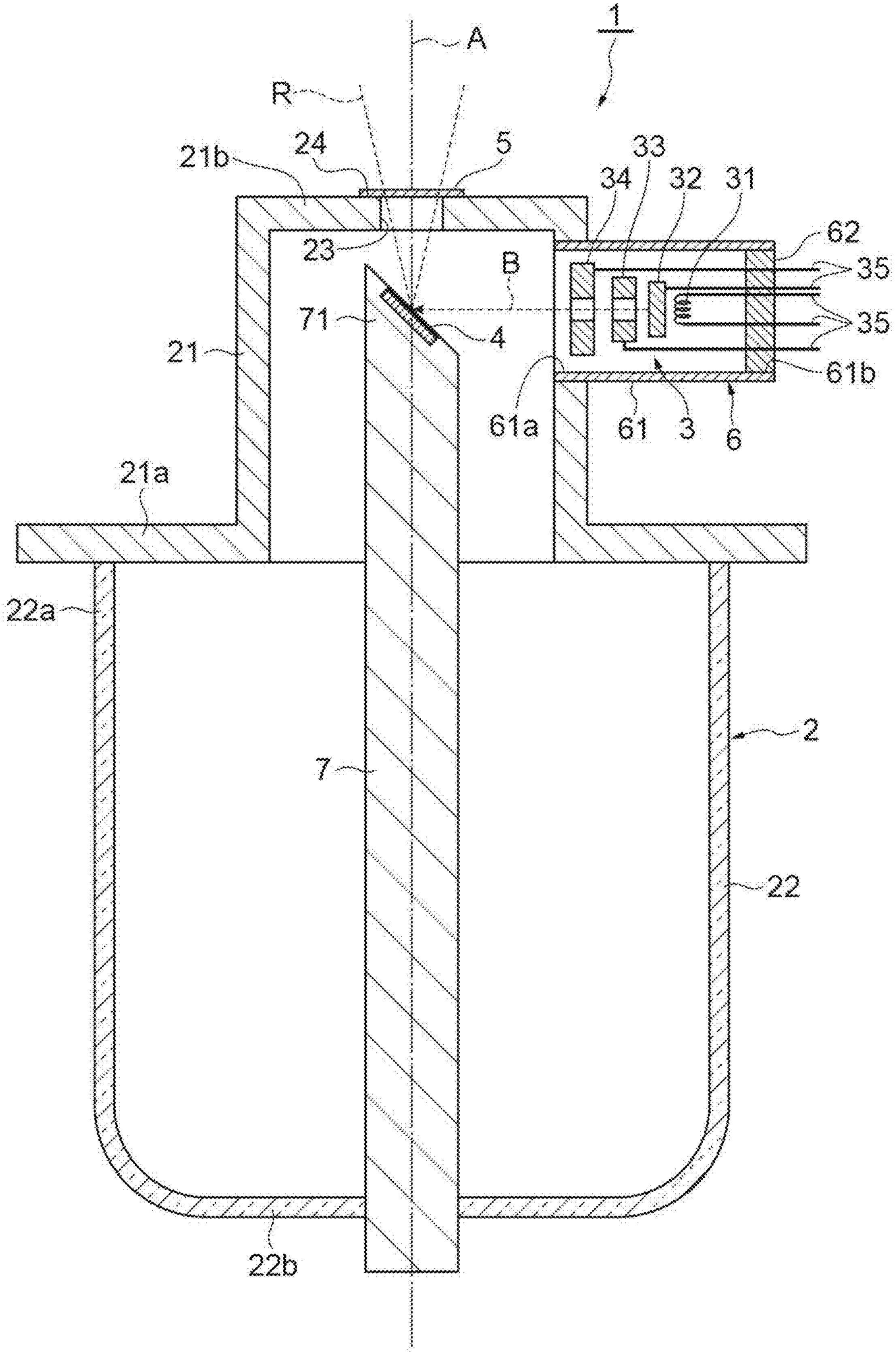
FIG. 5 is a cross-sectional view of an X-ray tube of a modification example.

The present disclosure is not limited to the embodiment. The X-ray tube 1 may be configured as a sealed reflection type X-ray tube. As shown in FIG. 5, the sealed reflection type X-ray tube 1 mainly differs from the sealed transmission type X-ray tube 1 in that the electron gun 3 is disposed inside an accommodation part 6 beside the head 21 and in that the target 4 is supported by a support member 7 instead of the window member 5. The accommodation part 6 includes a side tube 61 and a stem 62. The side tube 61 is joined to a side wall portion of the head 21 such that one opening portion 61*a* of the side tube 61 faces the interior of the head 21. The stem 62 seals the other opening 61*b* of the side tube 61. The heater 31, the cathode 32, the first grid electrode 33, and the second grid electrode 34 are disposed inside the side tube 61 in this order from a stem 62 side. The plurality of lead pins 35 penetrate through the stem 62. The support member 7 penetrates through the bottom wall portion 22*b* of the valve 22. The target 4 is fixed to a tip portion 71 of the support member 7 in a state where the target 4 is inclined on the tube axis A to face both the electron gun 3 and the window member 5.

In the X-ray generation device 10 including the sealed reflection type X-ray tube 1 configured as described above, as one example, in a state where the head 21 and the side tube 61 are set to the ground potential, a positive voltage is applied to the target 4 via the support member 7 by the power supply part 11, and a negative voltage is applied to each part of the electron gun 3 via the plurality of lead pins 35 by the power supply part 11. The electron beam B emitted from the electron gun 3 is focused onto the target 4 along a direction perpendicular to the tube axis A. The X-ray R generated in an irradiation region of the electron beam B on the target 4 transmits through the window member 5 and is emitted to the outside with the irradiation region as the focal point.

The X-ray tube 1 may be configured as an open transmission type X-ray tube or an open reflection type X-ray tube. The open transmission type or open reflection type X-ray tube 1 is configured such that the housing 2 is openable, and is an X-ray tube that allows components (for example, the window member 5 and each part of the electron gun 3) to be replaced. In the X-ray generation device 10 including the open transmission type or open reflection type X-ray tube 1, the degree of vacuum in the inner space of the housing 2 is increased by a vacuum pump.

In the sealed transmission type or open transmission type X-ray tube 1, the target 4 may be formed in at least a region of the second surface 52 of the window member 5, the region being exposed to the opening 23. In the sealed transmission type or open transmission type X-ray tube 1, the target 4 may be formed on the second surface 52 of the window member 5 with another film interposed therebetween.

In the method for manufacturing the window member 5 for a sealed reflection type X-ray tube or open reflection type X-ray tube, the step of forming the target 4 on the one surface of the window member 5 in the thickness direction D is not required.

REFERENCE SIGNS LIST

1: X-ray tube, 2: housing, 3: electron gun, 4: target, 5: window member, 10: X-ray generation device, 11: power supply part, 23: opening, 24: attachment surface, 51: first surface, 52: second surface, 110: single crystal diamond substrate, B: electron beam, R: X-ray.

The invention claimed is:

1. An X-ray tube comprising:
a housing;
an electron gun that emits an electron beam inside the housing;
a target that generates an X-ray upon an incidence of the electron beam inside the housing; and
a window member that seals an opening of the housing and that transmits the X-ray,
wherein the window member is formed in a plate shape from a single crystal diamond, and
a [100] direction of the single crystal diamond is in an intersection relationship with a thickness direction of the window member at an angle of less than 45 degrees.

2. The X-ray tube according to claim 1,
wherein a [010] direction and a [001] direction of the single crystal diamond are in an intersection relationship with a plane perpendicular to the thickness direction of the window member at an angle of less than 45 degrees.

3. The X-ray tube according to claim 1,
wherein the window member has a first surface opposite to an interior of the housing, and
the [100] direction of the single crystal diamond is in an intersection relationship with a direction perpendicular to the first surface at an angle of less than 45 degrees.

4. The X-ray tube according to claim 1,
wherein the window member is attached to an attachment surface of the housing around the opening, and
the [100] direction of the single crystal diamond is in an intersection relationship with a direction perpendicular to the attachment surface at an angle of less than 45 degrees.

5. The X-ray tube according to claim 1,
wherein the window member has a second surface on an interior side of the housing, and
the target is formed on the second surface.

6. The X-ray tube according to claim 5,
wherein the [100] direction of the single crystal diamond is in an intersection relationship with a direction of the incidence of the electron beam on the target at an angle of less than 45 degrees.

7. The X-ray tube according to claim 1,
wherein the [100] direction of the single crystal diamond is in an intersection relationship with the thickness direction of the window member at an angle of 0.1 degrees to 7 degrees.

8. An X-ray generation device comprising:
the X-ray tube according to claim 1; and
a power supply part that applies a voltage to the electron gun.

* * * * *